United States Patent [19]
Cusano

[11] 3,994,664
[45] Nov. 30, 1976

[54] PARALLEL ELECTRICAL SWITCHES

[75] Inventor: Dominic A. Cusano, Schenectady, N.Y.

[73] Assignee: General Electric Company, Schenectady, N.Y.

[22] Filed: June 30, 1975

[21] Appl. No.: 591,630

[52] U.S. Cl. .............................. 431/95 A; 315/323
[51] Int. Cl.² ........................................... F21K 5/02
[58] Field of Search .............. 431/93, 94, 95, 95 A, 431/98; 317/80; 338/18, 19, 20; 315/240, 323

[56] References Cited
UNITED STATES PATENTS

| | | |
|---|---|---|
| 3,532,931 | 10/1970 | Cote et al. .................... 431/95 A |
| 3,742,298 | 6/1973 | Cote .................................. 431/95 |

*Primary Examiner*—Edward G. Favors
*Attorney, Agent, or Firm*—Jerome C. Squillaro; Joseph T. Cohen; Stephen B. Salai

[57] ABSTRACT

Highly reliable electrical switches useful in multiple flash photolamp units are described as comprising a pair of spaced electrical conductors with radiation and voltage responsive materials overlying a portion of the conductors and the gap therebetween.

17 Claims, 4 Drawing Figures

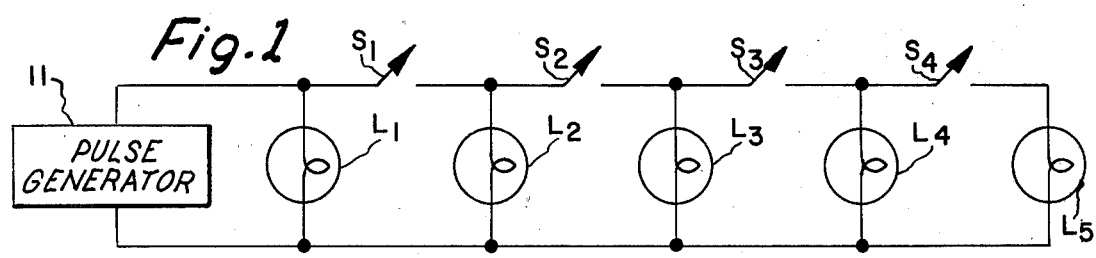
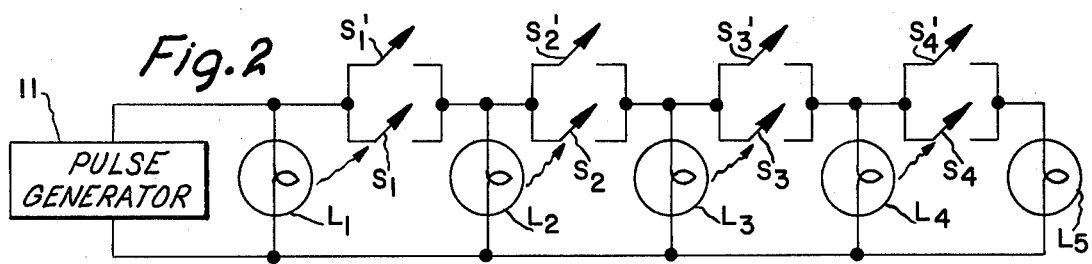
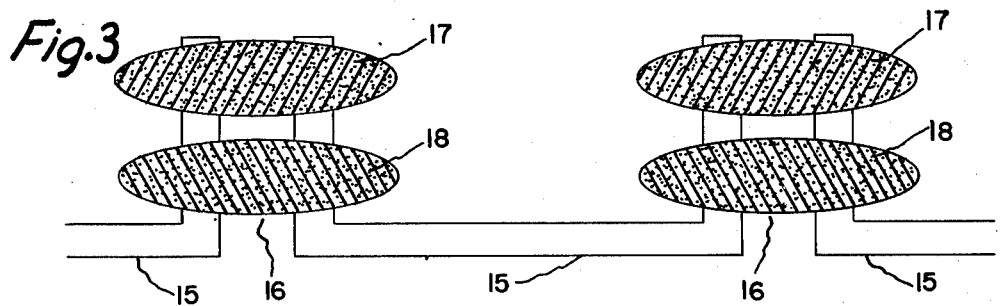
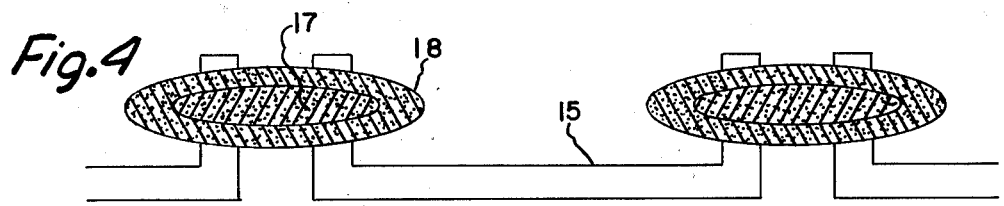

PARALLEL ELECTRICAL SWITCHES

The present invention relates to electrical switches and more particularly to parallel connected electrical switches characterized by an substantial change in resistance when subjected to either radiation or upon application of a voltage greater than the threshold voltage of the switch.

Photoflash units including a plurality of photoflash lamps which are intended to be fired sequentially, frequently utilize a switching element which is normally nonconducting until exposed to radiant energy, such as that from a photoflash lamp, at which time the switch becomes electrically conductive. One such switching device for a multiple flash lamp unit is proposed by H. G. Ganser, et al., U.S. Pat. No. 3,458,270, which discloses a series of flash units employing several flash lamps to be fired sequentially. In this unit, part of the thermal energy developed in firing the flash lamp actuates a switch for rendering the next flash lamp ready for firing. One type of switch disclosed by Ganser, et al., is a radiant energy sensitive switch which consists of nonconducting silver oxide together with a suitable binder overlying a pair of spaced contacts. Upon exposure to radiant energy, a chemical reaction occurs which causes the silver oxide to be converted to metallic silver, thereby providing a highly conductive electrical current path between the spaced electrodes. Unfortunately, such a switching arrangement is not entirely satisfactory where high reliability flash operation is required. For example, even if the radiation sensitive switch is 100 percent reliable, if for some reason a flash lamp fails to fire because of some internal lamp defect, all or a portion of the remaining unfired flash lamps cannot be utilized.

On the other hand, even voltage-responsive switches, such as those described in co-pending U.S. patent application Ser. Nos. 554,723, 554,724, and 554,725, filed Mar. 3, 1975 of common assignee as the instant application, have certain limitations. For example, the voltage-responsive switches described and claimed in the aforementioned patent applications exhibit an irreversible change in resistance from a high resistance state to a low resistance state upon application of a voltage in excess of a selectable threshold voltage. While these voltage-responsive switches have been found to be very reliable, under certain temperature-humidity cycling or storage at high ambient temperatures, these voltage-responsive switches may not provide the desired switching reliability.

Accordingly, my invention relates to a method and apparatus for making a highly reliable electrical switch characterized by a high resistance state of greater than one megohm and a low resistance state of less than one hundred ohms. Briefly, in accord with one embodiment of my invention, a highly reliable electrical switch comprises a substrate having a pair of electrical conductors thereon with a gap between the conductors, and a parallel arrangement of a radiation-responsive material overlying a portion of the conductors and the gap therebetween and a voltage-responsive material overlying a portion of the conductors and the gap therebetween. Both the radiation-responsive material and the voltage-responsive material are characterized by substantially nonconductive states and conductive states. Initially, both materials are in their nonconductive states; however, when subjected to either radiation or a voltage in excess of the threshold voltage of the voltage-responsive material, the material becomes electrically conductive. Hence the parallel arrangement of a radiation-responsive material and a voltage-responsive material on a pair of spaced conductors provides a highly reliable switch. Where a plurality of such switches are utilized in a multiple flash photolamp unit, highly reliable flash operation results.

Further objects and advantages of my invention, along with a more complete description thereof are provided in the following detailed description taken in conjunction with the accompanying drawing, in which:

FIG. 1 illustrates an electrical schematic diagram of a typical photoflash circuit of the prior art utilizing either radiation-responsive switches or voltage-responsive switches for sequencing photoflash lamps;

FIG. 2 is an electrical schematic diagram of a circuit for sequencing a plurality of photoflash lamps employing parallel connected voltage and radiation-responsive switches in accord with my invention; and FIGS. 3 and 4 illustrate alternative embodiments for constructing the parallel combinations of voltage and radiation-responsive switches in accord with my invention.

FIG. 1 illustrates a plurality of photoflash lamps L1 thru L5 connected to a pulse generator 11 through a plurality of switches S1 thru S4. In accordance with the prior art, the switches may, for example, be radiation-responsive or voltage-responsive switches, such as those described above. The pulse generator 11 may be switchable voltage source or, if desired, a piezoelectric generator, which produces an output voltage each time the piezoelectric element is struck mechanically.

Operationally, the application of a voltage to photoflash lamp L1 from the pulse generator 11 causes the lamp L1 to be fired. In the event that the switch S1 is a radiation-responsive switch, a portion of the radiation of the lamp L1 is directed to the switch S1 to render it conductive and ready for sequential firing of the lamp L2. In a similar manner, lamps L3, L4 and L5 may be fired. Alternatively, where the switches S1 thru S4 are voltage-responsive switches, the occurrence of a voltage pulse from the pulse generator 11 will be applied to lamp L1 first, since it represents a lower impedance path until fired, and then the next voltage pulse from the generator 11 is applied to the series combination of switch S1 and lamp L2. As soon as the threshold voltage of the switch S1 is exceeded, the lamp L2 fires. Once the threshold voltage of the switch S1 is exceeded, the impedance of the switch changes from a high resistance to a low resistance, thereby permitting sequential firing of the remaining lamps L3, L4, and L5 in a similar manner.

Even where the switches illustrated in FIG. 1 are 100 percent reliable, it is possible that all, or a portion, of the photoflash lamps may be aborted if a lamp becomes accidentally detached or otherwise becomes open-circuited. For example, if the switches S1 through S4 are radiation-responsive switches, if one of the photoflash lamps fails to ignite, there will be no illumination of the subsequent switch to render it conductive for the next sequential firing. On the other hand, if switches S1 thru S4 are voltage-responsive switches, under unusual ambient conditions such as high humidity and temperature cycling or storage at excessively high temperatures or humidity, it is possible that one of the switches may revert to its high impedance condiction, or may fail to switch from a high to a low impedance condition upon application of a voltage in excess of the threshold voltage. In either event, one or more of the photoflash lamps fails to ignite, rendering any remaining lamps useless.

FIG. 2 illustrates an embodiment of my invention wherein the foregoing difficulties are overcome by the parallel arrangement of a radiation-responsive switch and a voltage-responsive switch. More specifically, FIG. 2 illustrates a sequentially operated photoflash array of lamps L1 through L5 with radiation-responsive switches S1 thru S4 arranged in series with each lamp. Voltage-responsive switches S1' thru S4' are connected in electrical parallel relationship with the radiation-responsive switches to insure reliable flashability of the photoflash lamps.

In accordance with my invention, the parallel arrangement of the radiation-responsive and voltage-responsive switches are advantageously constructed in the manner illustrated in FIGS. 3 or 4. In FIG. 3, for example, electrical conductors 15 which may be printed or photoetched, for example, on a phenolic or epoxy circuitboard, include spaced apart regions 16 with a radiation-responsive material 17 bridging the gap therebetween and interconnecting the conductors 15. A voltage-responsive material 18 also bridges the gap between the spaced electrodes and is in electrical parallel relationship with the radiation-responsive material 17.

The radiation-responsive and voltage-responsive materials 17 and 18 may be formed between the spaced conductors by numerous processes, such as painting, printing, screening, or other suitable techniques.

Whereas FIG. 3 illustrates the voltage- and radiation-responsive materials as physically positioned adjacent to each other, it is readily apparent to those skilled in the art that other arrangements, such as that illustrated in FIG. 4, are possible. In FIG. 4, the radiation-responsive material 17 is positioned over the voltage-responsive material 18. As will become more apparent below, the arrangement illustrated in FIG. 4 provides reduced processing costs over that illustrated in FIG. 3 since a single heat treatment step can be utilized for both materials.

In practicing my invention, various voltage-responsive and radiation-responsive materials may be employed, as desired. However, highly-reliable switching operation is achieved by utilizing the voltage-responsive materials described in co-pending U.S. patent applications Ser. Nos. 554,723, 554,724 and 554,725. For example, the voltage-responsive material described in co-pending application Ser. No. 554,724 provides an irreversible change in resistance from a high-resistance condition of greater than one megohm to a low resistance condition of approximately 100 ohms. This voltage-responsive material is provided by heating substantially pure grade copper powder of approximately 99.99 percent purity in an oxidizing atmosphere for sufficient time to oxidize the outer surface of the copper powder. The oxidized copper powder is then mixed with a suitable binder, such as epoxy or nitrocellulose, to protect the oxidized copper from further oxidation and for providing adhesion of the copper powder to the spaced electrical conductors. The threshold voltage of the resulting voltage-responsive switch varies as a function of the firing or heating times of the resulting mixture. For example, at temperatures of between 70° and 130° C, the threshold voltage may be varied from approximately 200 volts to an excess of 1000 volts. A more detailed description of this voltage-responsive material and the method of making the same can be found in the above-referenced co-pending patent application.

Another voltage-responsive material including a copper oxide powder which is fired in a hydrogen environment, mixed with a suitable binder and then applied to a pair of spaced electrical conductors is described in my co-pending application Ser. No. 554,723. In this application, a copper oxide powder is fired in a hydrogen environment at a temperature of between approximately 100° to 300° C for approximately 3 hours. The resulting powder is then mixed with a binder such as epoxy or an anerobic adhesive and the resulting mixture is applied to a pair of spaced electrical contacts. The resulting mixture is then allowed to solidify and provide the desired voltage-responsive material. Variations in threshold voltage are obtained by either varying the spacing between the electrodes or the firing times and temperatures in the hydrogen atmosphere. Reference may be made to the foregoing application for a more detailed description of this voltage-responsive material, if desired.

Yet another voltage-responsive material is described in co-pending U.S. patent application Ser. No. 554,725 wherein substantially pure grade copper powder is mixed with a copper oxide powder. The addition of a suitable binder to the copper-copper oxide mixture and then applying the resulting mixture to a pair of spaced electrodes provides a highly reliable voltage-responsive switch.

A suitable radiation-responsive switch is described in co-pending U.S. patent application Ser. No. 490,585, now U.S. Pat. No. 3,944,961, wherein a precursor material, such as a silver salt in an organic binder, is deposited on a pair of spaced conductors, in a manner similar to that described above. The silver salt, such as silver carbonate, silver pyruvate, or silver acetylacetonate, is initially electrically nonconductive, but when excited by radiation, exothermically reacts to yield a conductor, such as silver, thereby providing reliable switching operation.

From the foregoing description, those skilled in the art can readily appreciate that I have described a novel photoflash lamp unit including reliable solid-state switching devices including a parallel arrangement of a radiation-responsive material and a voltage-responsive material electrically connected in a suitable circuit arrangement to provide highly reliable sequential firing of individual photoflash lamps.

While my invention has been described with reference to particular embodiments, modifications and variations will occur to those skilled in the art in view of the above teachings. Accordingly, it should be understood that within the scope of the appended claims, the invention may be practiced otherwise than as specifically described.

What is claimed as new is:
1. A photoflash lamp unit comprising:
 a plurality of flash lamps;
 circuit means for firing said lamps individually and sequentially, said circuit means including a plurality of solid-state switching devices, each switching device located adjacent one of said lamps to receive radiant energy emitted by said lamp;
 said solid-state switching devices each comprising a pair of spaced electrical conductors, and the parallel arrangement of a radiation-responsive switch material interconnecting said conductors; and a voltage-responsive switch material interconnecting said conductors.

2. The photoflash lamp unit of claim 1 wherein said solid-state switching devices initially exhibit a high resistance.

3. The photoflash lamp unit of claim 2 wherein said circuit means further comprises generator means for providing voltage pulses to said lamps.

4. The photoflash lamp unit of claim 3 wherein said generator means comprises a battery.

5. The photoflash lamp unit of claim 3 wherein said generator means comprises a piezoelectric element which produces a voltage each time the element is struck mechanically.

6. The photoflash lamp unit of claim 1 wherein said radiation-responsive material comprises a silver salt in an organic polymer binder.

7. The photoflash lamp unit of claim 6 wherein said silver salt is a member selected from the group consisting of silver carbonate, silver pyruvate, and silver acetylacetonate.

8. The photoflash lamp unit of claim 1 wherein said voltage responsive material comprises a copper-containing powder in an organic polymer binder.

9. The photoflash lamp unit of claim 8 wherein said copper-containing powder is copper oxide.

10. The photoflash lamp unit of claim 9 wherein said radiation sensitive material comprises a carbon-containing silver salt in an organic polymer binder.

11. An electrical switch characterized by a first high resistance state greater than 1 meghom and a second low resistance state of approximately 100 ohms, said switch comprising:

a pair of spaced electrodes;

a radiation-responsive material overlying a portion of said electrodes, said material characterized by a high resistance until excited by radiation and, thereafter, by a low resistance; and a voltage-responsive material overlying a portion of said electrodes, said latter material characterized by a high resistance until the threshold voltage of said latter material is exceeded and, thereafter, by a low resistance.

12. The electrical switch of claim 11 wherein said radiation-responsive material comprises a silver salt in an organic polymer binder.

13. The electrical switch of claim 12 wherein said silver salt is a member selected from the group consisting of silver carbonate, silver pyruvate, and silver acetylacetonate.

14. The electrical switch of claim 11 wherein said voltage-responsive material comprises a copper-containing powder in an organic binder.

15. The electrical switch of claim 14 wherein said one of said materials, at least partially, overlies the other material.

16. The electrical switch of claim 15 wherein said one material substantially overlies the other material.

17. The electrical switch of claim 11 wherein said materials are adjacent to each other, each material interconnecting the electrodes.

* * * * *